United States Patent
Park et al.

(10) Patent No.: US 8,630,289 B2
(45) Date of Patent: Jan. 14, 2014

(54) SWITCHING DEVICE OF DUAL-PORT ETHERNET SYSTEM

(75) Inventors: Dong Kyu Park, Gunpo (KR); Dae Hyun Kwon, Anyang (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 243 days.

(21) Appl. No.: 12/963,604

(22) Filed: Dec. 8, 2010

(65) Prior Publication Data

US 2011/0188497 A1    Aug. 4, 2011

(30) Foreign Application Priority Data

Feb. 3, 2010 (KR) .................. 10-2010-0009894

(51) Int. Cl.
*H04L 12/28*    (2006.01)

(52) U.S. Cl.
USPC ........................ 370/389; 709/232; 370/392

(58) Field of Classification Search
USPC .................................... 370/389, 392
See application file for complete search history.

(56) References Cited

U.S. PATENT DOCUMENTS

| | | | |
|---|---|---|---|
| 7,814,223 B2 * | 10/2010 | Arita et al. .................. | 709/235 |
| 2005/0165956 A1 * | 7/2005 | Lee .............................. | 709/238 |
| 2007/0071019 A1 | 3/2007 | Shimada | |
| 2007/0127424 A1 * | 6/2007 | Kwon et al. ................. | 370/338 |

FOREIGN PATENT DOCUMENTS

| | | |
|---|---|---|
| CN | 1420666 | 5/2003 |
| CN | 101238674 | 8/2008 |
| EP | 0734137 | 9/1996 |
| EP | 1793534 | 6/2007 |
| JP | 2003-158523 | 5/2003 |
| JP | 2003-318940 | 11/2003 |

OTHER PUBLICATIONS

Japan Patent Office Application Serial No. 2011-020318, Office Action dated Jan. 22, 2013, 4 pages.
The State Intellectual Property Office of the People's Republic of China Application Serial No. 201010595729.X, Office Action dated Jun. 4, 2013, 6 pages.

* cited by examiner

*Primary Examiner* — Patrice Winder
*Assistant Examiner* — Eyob Hagos
(74) *Attorney, Agent, or Firm* — Lee, Hong, Degerman, Kang & Waimey

(57) ABSTRACT

Disclosed is a switching device of a dual-port Ethernet system capable of solving a conflict caused by the dual-port in an Ethernet system having the dual-port. According to the present disclosure, there is little transmission delay when the data frame is relayed between ports in the dual-port Ethernet system. Further, when a frame relay transmission is simultaneously generated with a frame transmission of an upper layer device, it is possible to prevent a conflict by determining a priority.

4 Claims, 3 Drawing Sheets

SWITCHING DEVICE OF DUAL-PORT ETHERNET SYSTEM

Pursuant to 35 U.S.C. §119 (a), this application claims the benefit of earlier filing date and right of priority to Korean Patent Application No. 10-2010-0009894, filed on Feb. 3, 2010, the contents of which are hereby incorporated by reference in their entirety.

BACKGROUND OF THE DISCLOSURE

1. Field of the Invention

The present disclosure relates to an Ethernet system having a dual-port, and more particularly to a switching device capable of solving a conflict caused by the dual-port in an Ethernet system having the dual-port.

2. Description of the Related Art

Recently, Ethernet communication system has been largely spread in the field of the industry since it has many advantages due to its high speed, its popularization and familiarization, and its ease of connection to an office network.

Furthermore, Ethernet technology using a dual-port is a communication scheme that is highlighted as a next generation industrial communication network since it has an embedded switch function to connect one module to another and comfortable and redundant functions of wiring.

In order to use a dual-port Ethernet, it is necessary to have a function to switch one port to another. Representative switching types in the art include Store and Forward type and Cut Through type, wherein whether a data frame is stored or not is fixed. For reference, a frame is a data unit including an IP address, a MAC address and a payload, and a packet is a data unit including the IP address and payload.

However, the Ethernet switching type in the art is not suitable for an industrial Ethernet since it does not consider a real time property and a Daisy Chained network.

FIGS. 1a and 1b are views illustrating a Store and Forward switching type in a general dual-port Ethernet system. First, since the Ethernet system has plural Ethernet ports, Port A and Port B, the system includes two media access controllers 1. That is, each port is connected to each media access controller (MAC) of Ethernet. Each media access controller 1 is connected to an upper layer device through buses, and exchanges a data frame with the upper layer device through buses.

In order to relay the data frame between the plural ports, each media access controller 1 is connected to the other media access controller with buffers interposed therebetween. The relayed data frame is stored in the buffer 5 where error in checked. After then, the data frame is relayed if there is no error in the data frame.

At this moment, the data frame received from the media access controller 1 of Ethernet at each port is relayed to another port or transferred to the upper layer device through buses after passing through the buffer 5. At this time, the data frame output from the media access controller is temporarily stored in the buffer and then the data frame is transmitted to a target media access controller to be relayed after all the data frame is stored in the buffer. At this moment, there occurs a transmission delay by a length of data frame as shown in FIG. 1b.

FIGS. 2a and 2b are views illustrating a Cut Through switching type in a general dual-port Ethernet system.

First, since the Ethernet system has plural Ethernet ports, the system has two media access controller 1. That is, each port is connected to a media access controller of Ethernet, and the media access controller 1 is in turn connected to an upper layer device through buses and exchanges a data frame through buses.

In order to relay the data frame between plural ports, one media access controller 1 is connected to the other media access controller. The relayed data frame is transferred to the other media access controller, and then transmitted to the other port.

At this moment, the data frame received from the media access controller of Ethernet at each part is relayed to the other port or transferred to an upper layer device through buses. The data frame outputted from the media access controller 1 is transmitted to the target media access controller through buses. At this time, in the case that the data frame is relayed between ports while a data transmission is performed on the upper layer device, there occurs a conflict therebetween.

That is, generally, a relay delay by the length of data frame occurs in the Store and Forward type, and a conflict occurs in the Cut Through type in the case that data frame is relayed while data transmission is performed on the upper layer device.

SUMMARY OF THE INVENTION

According to an aspect of the present disclosure, there is provided a switching device of a dual-port Ethernet system comprising a media access controller for controlling transmission and reception of a frame through Ethernet so as to decide whether to accept the frame by comparing an IP address of the frame and a preset IP address; a transceiver buffer for transmitting and receiving a frame to and from an upper layer device, the transceiver buffer being connected to the upper layer device through certain buses; a data distributor for receiving a frame from the media access controller and transferring the frame to at least one of the transceiver buffer and a switch buffer; the switch buffer for receiving a frame from the data distributor and deciding whether to transmit the frame to a data selector of another media access controller; and a data selector for receiving a frame from each of the transceiver buffer and the switch buffer and transmitting the frame to the media access controller, the data selector selecting anyone of the frame inputted from the transceiver buffer and the frame inputted from the switch buffer by determining a priority of the frame and transferring the selected frame to the media access controller.

In some exemplary embodiments, the data distributor decides whether to transmit the frame to the switch buffer by determining at least one of a start address, a destination address and a data type of the frame.

In some exemplary embodiments, the switch buffer checks for FCS (frame check sequence) for the stored frame in the case that the frame transmission to the data selector of another media access controller is delayed, and does not transmit the frame when an error is detected.

In some exemplary embodiments, the switch buffer comprises a first switch buffer to transmit the frame transferred from the data distributor to another media access controller and a second switch buffer to transmit the frame transferred from another media access controller to the data selector.

BRIEF DESCRIPTION OF THE DRAWINGS

The accompanying drawings, which are included to provide a further understanding of the disclosure and are incorporated in and constitute a part of this application, illustrate embodiments of the disclosure and together with the description, serve to explain the principle of the disclosure. In the drawings.

DETAILED DESCRIPTION OF THE PREFERRED EMBODIMENTS

Figure 1A:
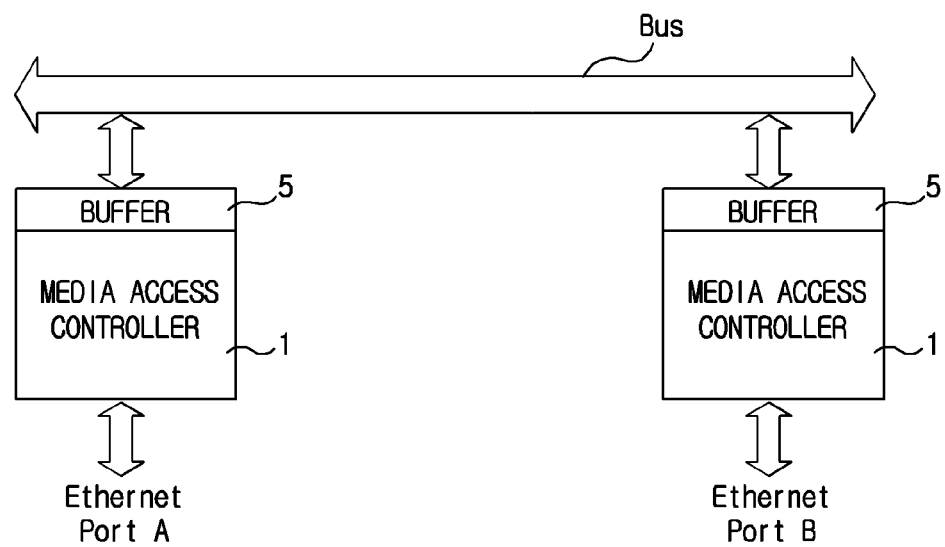
FIGS. 1a and 1b are views illustrating a Store and Forward switching type in a general dual-port Ethernet system.
Figure 1B:
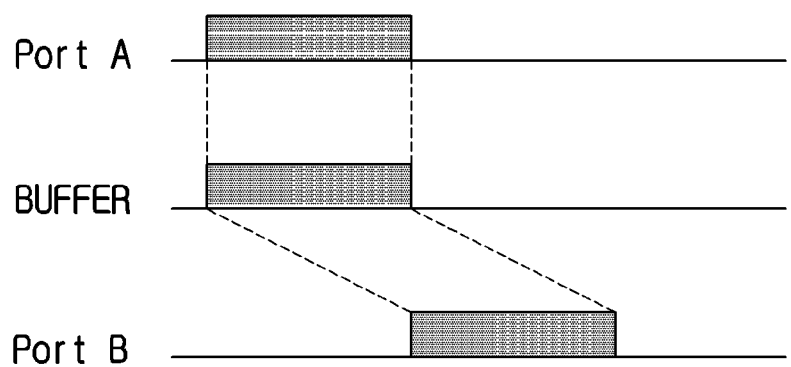
Figure 2A:
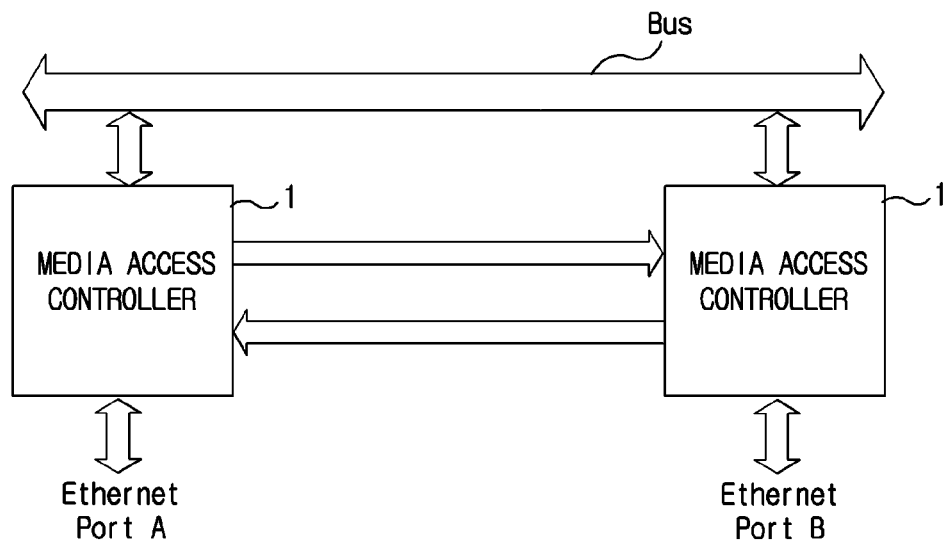
FIGS. 2a and 2b are views illustrating a Cut Through switching type in a general dual-port Ethernet system.
Figure 2B:
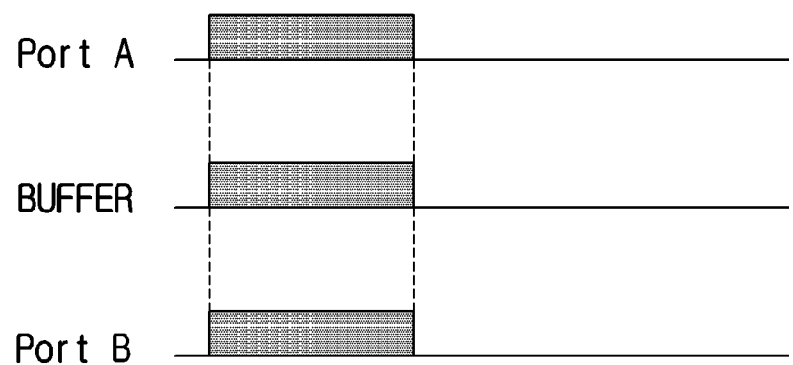

Hereinafter, a preferred embodiment of the present disclosure will be described with reference to the accompanying drawings, wherein elements having the same reference numeral designating represent like elements throughout the drawings. Further, certain detailed explanations of known function and construction are omitted when it is deemed that they may unnecessarily obscure the essence of the present disclosure.

Figure 3:
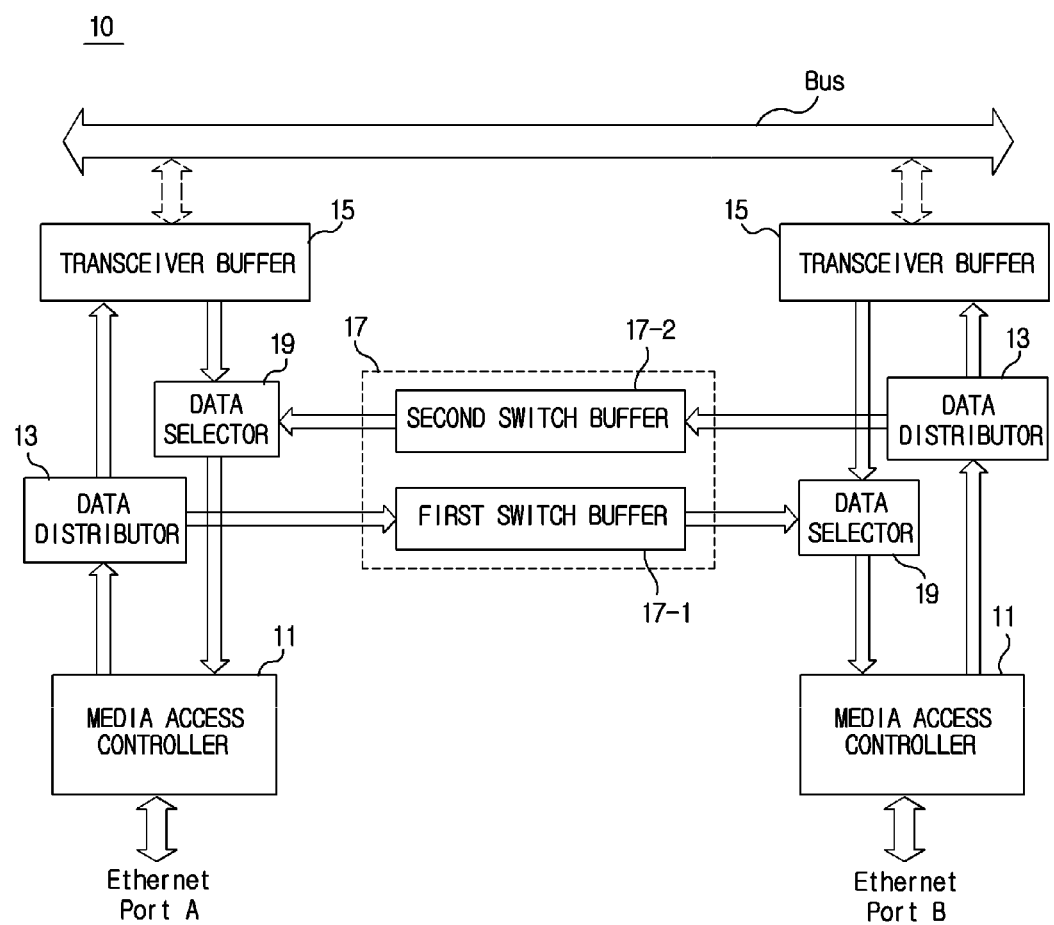
FIG. 3 is a view showing a dual-port Ethernet system in accordance with an embodiment of the present disclosure.

FIG. 3 is a view showing a dual-port Ethernet system in accordance with an embodiment of the present disclosure, wherein the Ethernet system 10 comprises a media access controller 11, a data distributor 13, a transceiver buffer 15, a switch buffer 17 and a data selector 19.

The media access controller 11 transmits and receives a frame through Ethernet. The media access controller 11 temporarily stores the frame transmitted or received, analyzes a header of the stored frame, and compares an IP address of the frame with a preset IP address, and then decides whether to receive the frame.

The data distributor 13 receives the frame from the media access controller 11 and transfers it to the transceiver buffer 15 and the switch buffer 17, respectively. The data distributor 13 compares at least one of a start address, a destination address and a data type of the received frame with preset reference information, and decides whether to transmit the frame to the switch buffer 17.

The transceiver buffer 15 is connected to an upper layer device through buses, and transmits and receives a data frame to and from the upper layer device.

The switch buffer 17 receives the frame from the data distributor 13 and decides whether to transmit the frame to the other media access controller 11. The switch buffer 17 comprises a first switch buffer 17-1 to transmit the frame transferred from the data distributor 13 to the other media access controller 11, and a second switch buffer 17-2 to transfer the frame transferred from the other media access controller 11 to the data selector 19.

The data selector 19 receives the frame from the transceiver buffer 15 and the switch buffer 17, respectively and transmits them to the media access controller 11. The data selector 19 selects anyone of the data frame inputted from the transceiver buffer 15 and the data frame inputted from the switch buffer 17 by determining a priority of the frame, and transmits the selected one to the media access controller 11.

The Ethernet system configured as described above includes two Ethernet ports, each of which is connected to a media access controller 11 of Ethernet and there are two media access controllers 11.

Each media access controller 11 is connected to an upper layer device through buses, and exchanges the frame with the upper layer device through buses. Each media access controller 11 transfers the frame received through a port to the data distributor 13, and the data distributor 13 transmits the received frame to the transceiver buffer 15 and switch buffer 17.

The transceiver buffer 15 transmits the frame transferred from the data distributor 13 to the upper layer device through buses. Further, each media access controller 11 is connected to the data selector 19, and the media access controller 11 receives the frame transmitted from the upper layer device through the data selector 19 and transmits it through a port.

According to the present disclosure, the data distributor 13, the data selector 19 and the switch buffer 17 are installed in order to relay the data frame between ports.

That is, the data distributor 13 simultaneously transmits the data frame received from the media access controller 11 to the transceiver buffer 15 (MAC FIFO) and the switch buffer 17 (switching FIFO). The data distributor 13 can decide whether to transmit the data frame received from the media access controller 11 to the switch buffer 17 by determining a start address, a destination address and a data type of the received data frame.

When the switch buffer 17 cannot transmit the data frame to the other media access controller 11 until all the data frame is received, and when error is detected by checking out FCS (Frame Check Sequence) for the data frame in the buffer, the switch buffer 17 does not transmit the data frame by its own switching operation. The FCS is a bit sequence used to detect error in the frame, which is calculated by an arbitrary algorithm when transmitted, and is transmitted together with an information frame.

There is a pointer generated for the data frame inputted from the data distributor 13 and for the data frame read from the data selector 19. When the pointer for the data frame read from the data selector 19 is greater than the pointer for the data frame inputted from the data distributor 13, the switch buffer 17 outputs an error signal to the data selector 19 so that it does not transmit the data frame to the data selector 19 anymore.

When the data selector 19 transmits the data frames, it determines a priority, selects anyone of the data frame inputted from the transceiver buffer 15 and the data frame input from the switch buffer 17, and transmits the selected data frame to the target media access controller 11.

Further, the data selector 19 stops an operation to read the data frame from the switch buffer 17 when an error signal is transmitted from the switch buffer 17.

Accordingly, in the present disclosure, there is little transmission delay when the data frame is relayed between ports in the dual-port Ethernet system. Further, when a frame relay transmission is simultaneously generated with a frame transmission of an upper layer device, it is possible to prevent a conflict by determining a priority.

That is, according to the present disclosure, the transmission delay is minimized by storing the relayed data frame in the switch buffer 17, transmitting the data frame to be transmitted according to a priority using the data selector 19 when an occupation conflict of a transmission line with an upper layer device occurs, and transmitting the data frame of the switch buffer 17 immediately when there is no conflict on the transmission line.

As such, the present disclosure also has advantages of the conventional Cut Through and Store and Forward by adding the data distributor 13, the switch buffer 17 and the data selector 19, so that it results a fast switching response needed for punctuality and daisy chained shape that are important in an industrial Ethernet.

Hereinbefore, while the present disclosure is described with reference to the preferred embodiment, it is obvious that other embodiments different from the detailed description may be embodied by those skilled in the art within the essence of the technical scope of the present disclosure. Here, the essence of the technical scope of the present disclosure is indicated in the following claims and it should be understood that all differences in the equivalent scope to the technical scope are included in the present disclosure.

What is claimed is:

1. A switching device of a dual-port Ethernet system, the switching device comprising:
   a media access controller configured for:
      controlling transmission and reception of frames via an Ethernet;
      determining whether to accept a received frame by comparing an Internet protocol (IP) address of the received frame to a preset IP address, and
      transmitting the frame to a data distributor; and
   a transceiver buffer connected to the upper layer device via buses and configured for:
      transmitting the frame to an upper layer device,
      receiving the frame from the upper layer device, and
      transmitting the frame received from the upper layer device to a data selector of another media controller,
   wherein the data distributor is configured for transferring the frame received from the media access controller to at least the transceiver buffer or a switch buffer,
   wherein the switch buffer is configured for receiving the frame transferred from the data distributor and determining whether to transmit the transferred frame to the data selector of the another media access controller,
   wherein the data selector of the another media access controller is configured for:
      transmitting the frame received from the transceiver buffer and the frame received from the switch buffer to the media access controller,
      selecting the frame received from the transceiver buffer or the frame received from the switch buffer by determining a priority of the received frames, and
      transferring the selected frame to the media access controller,
   wherein the data distributor is further configured for generating a first pointer for the frame received from the media access controller and generating a second pointer for the frame received from the switch buffer,
   wherein the switch buffer is further configured for outputting an error signal to the data selector when a value of the second pointer is greater than a value of the first pointer, and
   wherein the output error signal prevents the data selector from receiving the frame transmitted by the switch buffer.

2. The switching device of claim 1, wherein the data distributor is further configured for determining whether to transmit the received frame to the switch buffer based on at least a start address, a destination address or a data type of the received frame.

3. The switching device of claim 1, wherein the switch buffer is further configured for:
   checking for a frame check sequence (FCS) in the frame transferred from the data distributor when frame transmission to the data selector is delayed, and
   determining not to transmit the frame transmission to the data selector when an error in the frame is detected.

4. The switching device of claim 1, wherein the switch buffer comprises:
   a first switch buffer configured for transmitting the frame transferred from the data distributor to the another media access controller; and
   a second switch buffer configured for transmitting the frame transferred to the another media access controller to the data selector.

* * * * *